US012104021B2

(12) United States Patent
Kamphus et al.

(10) Patent No.: US 12,104,021 B2
(45) Date of Patent: *Oct. 1, 2024

(54) RECYCLING OF SUPERABSORBENT FIBERS WITH AN EXTENSIONAL FLOW DEVICE

(71) Applicant: The Procter & Gamble Company, Cincinnati, OH (US)

(72) Inventors: Juliane Kamphus, Schwalbach am Taunus (DE); Bruno Johannes Ehrnsperger, Bad Soden (DE); Arsen Arsenov Simonyan, Schwalbach am Taunus (DE); Dimitris Ioannis Collias, Mason, OH (US); John Andrew McDaniel, West Chester, OH (US); Martin Ian James, Hamilton, OH (US); Gary Wayne Gilbertson, Liberty Township, OH (US); Jacqueline Besinaiz Thomas, Oregonia, OH (US); Yiping Sun, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 61 days.

This patent is subject to a terminal disclaimer.

(21) Appl. No.: 17/591,650

(22) Filed: Feb. 3, 2022

(65) Prior Publication Data

US 2022/0267560 A1 Aug. 25, 2022

Related U.S. Application Data

(60) Provisional application No. 63/151,865, filed on Feb. 22, 2021.

(51) Int. Cl.
*C08J 11/16* (2006.01)

(52) U.S. Cl.
CPC ............ *C08J 11/16* (2013.01); *C08J 2333/08* (2013.01)

(58) Field of Classification Search
USPC ........................................................ 521/40.5
See application file for complete search history.

(56) References Cited

U.S. PATENT DOCUMENTS

| 5,244,934 | A | 9/1993 | Umeda et al. |
| 5,258,173 | A | 11/1993 | Waterfield |
| 5,338,537 | A | 8/1994 | White, Jr. |
| 5,618,003 | A | 4/1997 | Akiyoshi |
| 6,143,820 | A | 11/2000 | Klier |
| 8,383,746 | B2 | 2/2013 | Torii |
| 8,517,595 | B2 | 8/2013 | Morrison, Jr. |
| 8,952,116 | B2 | 2/2015 | Kobayashi |
| 9,095,853 | B2 | 8/2015 | Somma |
| 9,156,034 | B2 | 10/2015 | Somma |
| 9,822,203 | B2 | 11/2017 | Haag |
| 9,850,192 | B2 | 12/2017 | Harris et al. |
| 10,881,555 | B2 | 1/2021 | Panayotova |
| 11,154,839 | B2 | 10/2021 | Collias et al. |
| 11,319,670 | B2 | 5/2022 | Konishi |
| 11,525,047 | B2 | 12/2022 | Collias et al. |
| 11,649,336 | B2 | 5/2023 | Collias et al. |
| 11,746,210 | B2 | 9/2023 | Collias et al. |
| 2004/0200138 | A1 | 10/2004 | Parish |
| 2009/0003123 | A1 | 1/2009 | Morrison, Jr. et al. |
| 2011/0210469 | A1 | 9/2011 | Keller |
| 2012/0184670 | A1 | 7/2012 | Kobayashi |
| 2013/0172180 | A1 | 7/2013 | Naumann |
| 2017/0095792 | A1 | 4/2017 | Kim et al. |
| 2017/0166707 | A1 | 6/2017 | Jang et al. |
| 2017/0198105 | A1 | 7/2017 | Lee et al. |
| 2017/0245443 | A1 | 8/2017 | Zhang et al. |
| 2018/0171097 | A1 | 6/2018 | Layman et al. |
| 2018/0305518 | A1 | 10/2018 | Simonyan et al. |
| 2019/0249029 | A1 | 8/2019 | Gibanel |
| 2021/0053028 | A1 | 2/2021 | Collias et al. |
| 2021/0054163 | A1 | 2/2021 | Collias et al. |
| 2021/0054164 | A1 | 2/2021 | Banaszak Holl et al. |
| 2021/0054165 | A1 | 2/2021 | Simonyan |
| 2021/0197173 | A1 | 7/2021 | Ahn |
| 2021/0388172 | A1 | 12/2021 | Collias et al. |
| 2021/0388173 | A1 | 12/2021 | Collias et al. |
| 2022/0212165 | A1 | 7/2022 | Morita |
| 2022/0266322 | A1 | 8/2022 | Kamphus et al. |
| 2023/0167265 | A1 | 6/2023 | Simonyan |
| 2023/0366498 | A1 | 11/2023 | Nowicki |

FOREIGN PATENT DOCUMENTS

| CN | 102770251 A | 11/2012 |
| CN | 108822337 A | 11/2018 |
| EP | 1757646 A1 | 2/2007 |
| GB | 1013757 A | 12/1965 |
| JP | H04317784 A | 11/1992 |
| JP | H04317785 A | 11/1992 |
| JP | H06313008 A | 11/1994 |

(Continued)

OTHER PUBLICATIONS

All Office Actions; U.S. Appl. No. 17/591,646, filed Feb. 3, 2022.
All Office Actions; U.S. Appl. No. 17/591,648, filed Feb. 3, 2022.
All Office Actions; U.S. Appl. No. 17/591,654, filed Feb. 3, 2022.
U.S. Appl. No. 17/591,646, filed Feb. 3, 2022, to first inventor Juliane Kamphus et. al.
U.S. Appl. No. 17/591,648, filed Feb. 3, 2022, to first inventor Juliane Kamphus et. al.
U.S. Appl. No. 17/591,654, filed Feb. 3, 2022, to first inventor Juliane Kamphus et. al.
Caruso et al. "Mechanically-Induced Chemical Changes in Polymeric Materials", Chemical Reviews, vol. 109, Issue 11, Oct. 14, 2009, pp. 5755-5798.
Search Report and Written Opinion for PCT/US2022/017194 dated Jul. 18, 2022, 10 pages.

(Continued)

*Primary Examiner* — Terressa Boykin
(74) *Attorney, Agent, or Firm* — William E. Gallagher; Sarah M. Decristofaro

(57) ABSTRACT

Superabsorbent fibers (SAF) in a feed stream is converted into soluble polymers in an extensional flow device. The total energy used to degrade the SAF into soluble polymers is less than about 50 MJ/kg SAF.

22 Claims, No Drawings

(56) References Cited

FOREIGN PATENT DOCUMENTS

| | | |
|---|---|---|
| JP | H09249711 A | 9/1997 |
| JP | 2001316519 A | 11/2001 |
| JP | 2003321574 A | 11/2003 |
| JP | 2004317319 A | 11/2004 |
| JP | 2012219038 A | 11/2012 |
| JP | 2019137963 A | 8/2019 |
| WO | 2012140981 A1 | 10/2012 |
| WO | 2019151538 A1 | 8/2019 |
| WO | 2020217757 A1 | 10/2020 |
| WO | 2022081523 A1 | 4/2022 |
| WO | 2022098959 A1 | 5/2022 |

OTHER PUBLICATIONS

Li et al. "Ultraviolet-induced decomposition of acrylic acid based superabsorbent hydrogels crosslinked with N, Nmethylene-bisacrylamide", Journal of Applied Polymer Science, vol. 108, Issue 6, Jun. 15, 2008, pp. 3435-3441.

Prajapat et al. "Intensification of depolymerization of polyacrylic acid solution using different approaches based on ultrasound and solar irradiation with intensification studies", Ultrasonics Sonochemistry, vol. 32, Issue 6, Sep. 1, 2016, pp. 290-299.

Shukla et al. "Photo, thermal, and ultrasonic degradation of EGDMA-crosslinked poly (acrylic acid-co-sodium acrylate-coacrylamide) superabsorbents", Journal of Applied Polymer Science, vol. 125, Issue 1, Jul. 5, 2012, pp. 630-639.

All Office Actions, U.S. Appl. No. 17/000,413, filed Aug. 24, 2020.
All Office Actions, U.S. Appl. No. 16/548,873.
All Office Actions, U.S. Appl. No. 16/999,127.
All Office Actions, U.S. Appl. No. 17/341,476, filed Jun. 8, 2021.
All Office Actions, U.S. Appl. No. 17/341,479, filed Jun. 8, 2021.
All Office Actions; U.S. Appl. No. 18/100,151, filed Jan. 23, 2023.

Basedow et al., "Ultrasonic Degradation of Polymers in Solution", Advances in Polymer Science, vol. 22, 1977, pp. 83-148.

Caruso et al., "Mechanically-Induced Chemical Changes in Polymeric Materials", Chem. Rev. 2009, vol. 109, pp. 5755-5798.

Dubinsky et al., "Thermal Degradation of poly(acrylic acid) Containing Copper Nitrate", Polymer Degradation and Stability, vol. 86, 2004, pp. 171-178.

Ebrahimi et al., "The Study of Ultrasonic Degradation of Superabsorbent Hydrogels", vol. 2012, Article ID 343768, 06 pages.

Gurkaynak et al., "High-Temperature Degradation of Polyacrylic Acid in Aqueous Solution", Journal of Polymer Science Part A: Polymer Chemistry, vol. 34, 1996, pp. 349-355.

Kaczmarek et al., "Photo-Oxidative Degradation of Some Water-Soluble Polymers in the Presence of Accelerating Agents", Die Angewandte Makromolekulare Chemie 261/262, 1998, pp. 109-121.

Le'pine et al., "Thermal Degradation of Polyacrylic Acid in Dilute Aqueous Solution", Polymer Degradation and Stability, vol. 75, 2002, pp. 337-345.

Li et al., "Ultraviolet-Induced Decomposition of Acrylic Acid-Based Superabsorbent Hydrogels Crosslinked with N,N-Methylenebisacrylamide", Department of Chemistry and Chemical Engineering, Zhongkai University, Guangzhou, CN, Aug. 10, 2007, pp. 3435-3441.

Linden et al., "Photooxidative Degradation of Polymers by HO and HO2 Radicals Generated During the Photolysis of H2O2, FeCl3, and Fenton Reagents", Coordination Chemistry Reviews, 125 (1993) pp. 195-217.

McGaugh et al., "The Thermal Degradation of Poly(Acrylic Acid)", Polymer Letters, vol. 5, 1967, pp. 817-820.

McNeill et al, "Thermal Stability and Degradation Mechanisms of Poly(Acrylic Acid) and its Salts: Part 1—Poly(Acrylic Acid)", Polymer Degradation and Stability, 29 (1990), pp. 233-246.

McNeill et al., "Thermal Stability and Degradation Mechanisms of Poly(Acrylic Acid) and its Salts: Part 2—Sodium and Potassium Salts", Polymer Degradation and Stability, vol. 30, 1990, pp. 213-230.

McNeill et al., "Thermal Stability and Degradation Mechanisms of Poly(Acrylic Acid) and its Salts: Part 3—Magnesium and Calcium Salts", Polymer Degradation and Stability, vol. 30, 1990, pp. 267-282.

Mierzwa et al., "UV-Hydrogen Peroxide Processes", Advanced Oxidation Processes for Wastewater Treatment, Chapter 2, University of Sao Paulo, Sao Paulo SP Brazil, 2018, 36 pgs.

Prajapat et al., "Intensification of Depolymerization of Polyacrylic Acid Solution Using Different Approaches Based on Ultrasound and Solar Irradiation with Intensification Studies", Ultrasonics Sonochemistry, vol. 32, 2016, pp. 290-299.

Saita et al., "Degradation of Sodium-Polyacrylate in Dilute Aqueous Solution II", Japanese Journal of Applied Physics, vol. 22, No. 8, Aug. 1983, pp. 1310-1314.

Shukla et al, "Ultrasonic Degradation of Poly(acrylic acid)", Journal of Applied Polymer Science, vol. 112, 2009, pp. 991-997.

Shukla et al., "Oxidative and Photooxidative Degradation of Poly(acrylic acid)", Polymer Degradation and Stability, vol. 94, 2009, pp. 1238-1244.

Shukla et al., "Photo, Thermal and Ultrasonic Degradation of EGDMA-Crosslinked Poly(acrylic acid-co-sodium acrylate-co-acrylamide) Superabsorbents", Journal of Applied Polymer Science DOI 10.1002, Dept. of Chemical Engineering, Indian Institute of Science, 2011, pp. 630-639.

RECYCLING OF SUPERABSORBENT FIBERS WITH AN EXTENSIONAL FLOW DEVICE

FIELD

The present disclosure generally relates to recycling of superabsorbent fibers (SAF) using an extensional flow device at short residence times, with optional and additional cavitation. More specifically, a feed stream comprising SAF is fed into the extensional flow device and a product stream is produced, which comprises essentially soluble polymers. The concentration of SAF in the feed stream is greater than about 1 wt %, and the total energy used to convert SAF to soluble polymers is less than about 50 MJ/kg SAF.

BACKGROUND

Recycling of absorbent hygiene products (AHPs) (i.e., baby diapers, feminine protection pads, and adult incontinence pads) is good for the environment and needed to achieve the sustainability goals of many consumer companies. These goals are about using 100% recycled materials and having zero consumer and manufacturing waste go to landfill. In addition to these goals, successful recycling benefits the environment, stimulates the economy, improves people's health and water quality, and generates energy needed by consumers in developing regions of the world.

The major component in AHPs is typically the superabsorbent polymer (SAP), whereas other components are adhesives, cellulose fibers, polyethylene, polypropylene, and polyester. SAP is a water-absorbing, water-swellable, and water-insoluble powdered solid which is a crosslinked and partially neutralized homopolymer of glacial acrylic acid. SAP has an exceptionally high ability to absorb aqueous liquids, such as contaminated water or urine. An alternative to poly(acrylic acid) based SAP are superabsorbent fibers (SAF). These fibers generally comprise a relatively large amount of comonomers (when compared with superabsorbent polymer particles). Therefore, similar to SAP, there is also a need to recycle SAF used in AHPs.

Recycling of AHPs involves cleaning of the AHPs from the soils accumulated during their use and separating the various components into recycled material streams. More specifically, the recycled SAF material stream can be used in applications less demanding than AHPs (since the recycled SAF has inferior properties compared to virgin SAF; for example, agricultural or horticultural water-retaining agents, and industrial waterproofing agents) and/or can be converted to essentially non-crosslinked, and slightly branched or linear soluble polymers. These soluble polymers can be used as a feed material to various applications. For example, the soluble polymers can be: 1) used as-is in applications such as water treatment or corrosion inhibition; or 2) esterified and then used in adhesives, coatings, etc.; or 3) used as-is in SAF making such as SAF fiber spinning or 4) transformed into SAF (see item 3)) and blended with virgin SAF. The first two sets of applications are part of the effort to recycle SAF into other products by replacing virgin compounds with compounds derived from recycled SAF, whereas the last two sets of applications are part of the circular economy of SAF, i.e., recycling SAF back to SAF. In all cases, the objective is to achieve the same properties as virgin materials.

While no references have been identified to address degradation of SAF not purely based on acrylic acid, non-limiting examples of processes that produce purified and separated material streams of used SAP from recycled AHPs are disclosed and claimed in U.S. Pat. No. 9,095,853 B2, issued on Aug. 4, 2015; and 9,156,034 B2, issued on Oct. 13, 2015; both assigned to Fater S.p.A, based in Pescara, Italy.

Most SAPs are based on poly(acrylic acid) and are crosslinked network materials. Non-limiting examples of procedures used to produce SAPs from glacial acrylic acid and crosslinkers are disclosed in U.S. Pat. No. 8,383,746 B2, issued on Feb. 26, 2013, and assigned to Nippon Shokubai Co., Ltd, based in Osaka, Japan; and U.S. Pat. No. 9,822,203 B2, issued on Nov. 21, 2017, and assigned to BASF SE, based in Ludwigshafen, Germany.

Ultrasonic degradation of SAP is described in: (1) Ebrahimi, R., et al., *Organic Chemistry Intl*, 2012, Article ID 343768, 5 pages; and (2) Shukla, N. B., and Madras, G., *J. Appl. Polym. Sci.*, 125 (2012), 630-639. Ultrasonic degradation of PAA is described in: (1) Shukla, N. B., et al., *J. Appl. Polym. Sci.*, 112 (2009), 991-997; and (2) Prajapat, A. L., and Gogate, P. R., *Ultrason. Sonochem.*, 32 (2016), 290-299. Also, a general description of ultrasonic degradation of polymers in solution is given in: Basedow, A. M., and Ebert, K. H., *Adv. Polym. Sci.*, 22 (1977), 83-148.

For the degradation of SAPs, both references used viscosity as a measure of the degradation level and found that it takes about 5 to 10 min to reduce the viscosity by one order of magnitude, e.g. from 10 Pa·s to 1 Pa·s, which indicates that a lot of energy is needed to achieve that level of degradation. For the degradation of linear polymers, the main themes from these references (as well as other references that report on the use of UV, thermal, and other forms of energy) are that the (1) preferential scission is at the mid-point of the polymer chain, (2) the higher molecular weight chains are degraded at a higher rate than the lower molecular weight chains, and (3) there is a minimum molecular weight below which degradation or de-polymerization does not occur. In all cases, the ultrasonic degradation of polymers is due to cavitation, and fast growth and collapse of the resulting microbubbles.

Accordingly, there is a need to recycle AHPs and their major component, which is SAF for some AHPs. For the recycling of SAF, there is a need to degrade SAF into soluble polymers, in short time scale; with low energy and power per unit mass of SAF; and at mild conditions, such as room temperature, thus avoiding chemical decomposition such as decarboxylation of the degraded SAF. The requirement for low energy per unit mass of SAF stems from the fact that the recycling of used SAF and its degradation to soluble polymers is beneficial only if the energy spent during the converting of SAF to soluble polymers is less than, e.g. that used to make fossil-derived soluble polymers of same kind. For acrylic acid (petro-AA) from propylene the required energy is about 50 MJ/kg AA. The soluble polymers produced from SAF can then be incorporated back into virgin SAF (thus increasing its recycled content and supporting the circular economy of SAF) and/or derivatized into materials for other applications, such as, adhesives, coatings, water treatment, fabric care, etc.

SUMMARY

In one embodiment of the present disclosure, a method for degrading superabsorbent fibers (SAF) to soluble polymers is presented, wherein the soluble polymers comprise from 5 weight-% to 75 weight-% of polymerized acrylic acid monomer units, preferably from 10 weight-% to 75 weight-%, or from 10 weight-% to 70 weight-% based on the total weight of the soluble polymers. As used herein, the term "acrylic acid monomer units" excludes derivatives of acrylic acid monomers, such as esters and amides, and also excludes methacrylic acid monomer units and salts thereof.

The method comprises flowing a feed stream comprising the SAF into an inlet of an extensional flow device and producing a product stream comprising the soluble polymers at an outlet of the extensional flow device; wherein the feed stream comprises the SAF at a concentration greater than about 1 wt %; wherein the feed stream has a residence time in the extensional flow device of less than about 120 s; and wherein the degradation of the SAF to the soluble polymers requires a total energy of less than about 50 MJ/kg SAF.

Also, a method for degrading superabsorbent fibers (SAF) to soluble polymers is presented, wherein the soluble polymers comprise from 5 weight-% to 75 weight-% of polymerized acrylic acid monomer units preferably from 10 weight-% to 75 weight-%, or from 10 weight-% to 70 weight-% based on the total weight of the soluble polymers. The method comprises flowing a feed stream comprising the SAF into an inlet of an extensional flow device and producing a product stream comprising soluble polymers at an outlet of the extensional flow device; wherein the feed stream comprises water and the SAF at a concentration greater than about 1 wt %; wherein the feed stream has a residence time in the extensional flow device of less than about 120 s; wherein the degradation of the SAF to the soluble polymers requires a total energy of less than about 16 MJ/kg SAF; and wherein the soluble polymers have a weight-average molecular weight less than about 1,000,000 g/mol.

The present disclosure further relates to a method for degrading superabsorbent fibers (SAF) to soluble polymers, wherein the soluble polymers comprise from 5 weight-% to 75 weight-% of polymerized acrylic acid monomer units preferably from 10 weight-% to 75 weight-%, or from 10 weight-% to 70 weight-% based on the total weight of the soluble polymers. The method comprises flowing a feed stream comprising the SAF into an inlet of an extensional flow device and producing a product stream comprising soluble polymers at an outlet of the extensional flow device; wherein the feed stream comprises water and the SAF at a concentration greater than about 5 wt %; wherein the feed stream has a residence time in the extensional flow device of less than about 120 s; wherein the degradation of the SAF to the soluble polymers requires a total energy of less than about 16 MJ/kg SAF; and wherein the soluble polymers have a weight-average molecular weight less than about 1,000,000 g/mol.

The soluble polymers may be water-soluble. The soluble polymers preferably have a solubility in water at 25° C. of more than 5 g of soluble polymer per 100 g water, or more than 15 g of soluble polymer per 100 g water, or from 20 g to 120 g of soluble polymer per 100 g water or from 35 g to 100 g of soluble polymer per 100 g water.

The soluble polymers obtained by the method of the present disclosure can be subjected to the NMR Content Method set out below. The NMR Content Method can be used to determine the ratio on a molar basis of protons of functional groups with different NMR signals such as alkene terminal moieties, alkoxy groups (—O—CHR1—with R1 one of the group H, alkyl, aryl, heteroaryl, alkoxy or halogene), aliphatic groups (—CHR1—with R1 one of the group H, alkyl, aryl, heteroaryl or halogene) and/or other 1H-NMR active groups. The NMR Content Method also enables the determination of many monomer units other than acrylic acid monomer units, which are comprised in the soluble polymers, given that the spectra obtained by the NMR Content Method allow the determination of various functional groups due to their different NMR signals.

The soluble polymers obtained by the method of the present disclosure may have a ratio 3.6:CH of at least 0.04, as determined by the NMR Content Method described herein. The soluble polymers may have a ratio 3.6:CH of at least 0.1, or at least 0.2 as determined by the NMR Content Method described herein. The soluble polymers may have a ratio 3.6:CH of not more than 0.7 as determined by the NMR Content Method described herein.

The soluble polymers obtained by the present disclosure may have a content "%3.6 ppm" of at least 5%, as determined by the NMR Content Method described herein. The soluble polymers may have a content "%3.6 ppm" of at least 10%, or at least 15%, as determined by the NMR Content Method described herein. The soluble polymers may have a content "%3.6 ppm" of not more than 75%, as determined by the NMR Content Method described herein.

The soluble polymers obtained by the method of the present disclosure may have a content of alkene, "% alkene", of not more than 0.31%, as determined by the NMR Content Method described herein.

DETAILED DESCRIPTION

I Definitions

As used herein, the term "SAF" refers to superabsorbent fibers. The SAF of the present disclosure are capable of absorbing a 0.9 wt % saline solution at 25° C. at least 7 times their dry weight, preferably at least 10 times their dry weight as measured according to the Centrifuge Retention Capacity (CRC) test as described herein. The typical absorption mechanism is osmotic pressure. SAF that absorbs water or aqueous solutions becomes softer and gel-like.

"Superabsorbent fiber" ("SAF") is used herein to refer to superabsorbent polymer material that is in a fibrous form. The superabsorbent fibers have a length and a cross-section. The length is the largest dimension of the fiber when the fiber is or would be laid flat and straight on a surface, such that curves or crimps in the fiber disappear and the fiber becomes an approximately rod-like form. The cross-section is orthogonal to the length. For purposes herein, a fiber is a material that has a largest dimension and smallest dimension, wherein the ratio of largest dimension to smallest dimension is at least 10:1, preferably at least 15:1, even more preferably at least 20:1, i.e. the largest dimension of the superabsorbent fiber (also called the length) is at least 10 times, or at least 15 times, or at least 20 times the smallest dimension of the fiber (also called width). If a superabsorbent fiber has a cross-section that varies along the length of the fiber, the largest dimension of the cross-section (determined along the length of the fiber) is taken as the width of the fiber when calculating the ratio of largest dimension to smallest dimension.

As used herein, the term "soluble polymer" refers to a non-crosslinked, and either slightly branched or linear polymer, the polymer comprising from 5 weight-% to 75 weight-% of acrylic acid, or from 10 weight-% to 75 weight-%, or from 10 weight-% to 70 weight-% as the monomeric unit and degree of polymerization that can be 2 or higher. For the purposes of the present disclosure, for soluble polymers there will be no difference between a polymer and an oligomer.

As used herein, the term "degradation" refers to the conversion of SAF into soluble polymers via the actions of partial de-polymerization, de-crosslinking, molecular backbone breaking, or any combination of the above actions. For the purposes of the present disclosure, the terms degradation, recycling, and conversion are used interchangeably, as long as they refer to the transformation of SAF to soluble polymers. Also, the degradation essentially preserves the carboxylic groups of the SAF and thus the product soluble polymers contains those carboxylic groups. Note that full de-polymerization of SAF should lead to the monomers that were comprised by the SAF.

As used herein, the term "virgin SAF" refers to SAF produced from virgin monomers, which is the feedstock used today to make SAF. Virgin monomers can be produced from either fossil-derived materials or other bio-derived materials (non-limiting examples of bio-materials are: lactic acid, 3-hydroxypropionic acid, glycerin, bio-propylene, carbon dioxide, and sugar). Virgin SAF does not include any recycled SAF above about 1 wt %.

As used herein, the term "used SAF" refers to SAF which has already been produced industrially and/or used commercially, for example, in a baby diaper, feminine pad, adult incontinence pad, or other articles and/or uses. Used SAF can be post-consumer SAF, post-industrial SAF, or combinations of both. Unless otherwise noted in this disclosure, SAF refers to either "used SAF" or "virgin SAF".

As used herein, the term "degraded SAF" refers to SAF which has been degraded to soluble polymers. The terms "degraded SAF" and "soluble polymers" are used interchangeably herein.

As used herein, the term "recycled SAF" refers to SAF which contains at least 1 wt % degraded SAF (or equivalently, soluble polymers) that has been incorporated into the SAF while the SAF is being produced from acrylic acid and co-monomers using the typical production method. Thus, the recycled SAF is a blend of virgin SAF and at least 1 wt % degraded SAF.

As used herein, the term "feed stream" refers to a body of fluid that flows in a specific direction and feeds into an inlet of an extensional flow device.

As used herein, the term "product stream" refers to a body of fluid that is produced at an outlet of an extensional flow device when the feed stream is fed into an inlet of the same device.

As used herein, the term "Liquid Whistle" refers to a Sonolator type of equipment (manufactured by the Sonic Corporation, Stratford, CT) which employs, in the flow direction, an inlet chamber, an orifice, and a mixing chamber with a blade in front of the orifice. Material flows through the orifice and the generated jet impinges on the blade which is then forced to vibrate at its resonant frequency and further enhance the cavitation field, if it is located within 7 to 8 times the hydraulic diameter of the orifice away from the orifice (i.e., the blade is engaged). If the blade is located outside the range of 7 to 8 times the hydraulic diameter of the orifice away from the orifice, then it is considered that the blade is not engaged. The closer to the orifice the blade is and the lower the viscosity of the feed stream is the stronger the cavitation is. The main uses of the Liquid Whistle (LW) are mixing, emulsification, deagglomeration, and disinfection in the home, personal care, and fine chemicals industries (U.S. Pat. No. 8,517,595 B2 and Ryan, D. J., et al., *Chem. Engng Sci.*, 189 (2018), 369-379). For the purposes of the present disclosure, LW is one of the extensional flow devices that can be used.

As used herein, the term "extensional flow device" refers to a flow device that generates extensional flow, strain, and stress. Non-limiting examples of extensional flow devices are devices with converging and/or diverging channels, orifices, impinging jets, four roll mills, screens, dies, etc. The terms "extensional" and "elongational" are used interchangeably herein.

As used herein, the terms "viscosity ratio" or "viscosity reduction ratio" refer to the ratio of the viscosity of the product stream to that of the feed stream. The viscosity of the feed stream is typically measured with a parallel plate fixture in oscillatory mode, and the complex viscosity reported typically corresponds to a frequency of 1 rad/s. The real and imaginary part of the complex viscosity represent the dynamic viscosity and the storage viscosity, respectively. For calculating the viscosity ratio we use the dynamic viscosity i.e. the real part of the complex viscosity. The viscosity of the product stream is measured with either a cup and bob fixture in steady mode or parallel plate fixture in oscillatory mode. When the viscosity is measured with a cup and bob fixture in steady mode the viscosity reported typically corresponds to a shear rate of 4 $s^{-1}$. These viscosity measurement techniques are well known to those skilled in the art. For the purposes of the present disclosure, the negative of the decadic logarithm of the viscosity ratio indicates the extent of the SAF degradation to soluble polymers in orders of magnitude, as it is accepted by those skilled in the art that the lower the viscosity of a given soluble polymer solution the lower the molecular weight of the soluble polymers is, at a fixed concentration.

As used herein, $M_n$ is the number average molecular weight, in g/mol or equivalently Da, $M_w$ is the weight average molecular weight, in g/mol or equivalently Da, $M_z$ is the z-average molecular weight, in g/mol or equivalently Da, and PDI is the polydispersity index defined as $M_w/M_n$.

II Feed Stream

Unexpectedly, it has been found that SAF degrades to soluble polymers (i.e., essentially, without decarboxylation) when the SAF feed stream (which is in the form of a gel) flows in the extensional flow device (e.g. LW) and experiences the extensional flow at short residence times. Without wishing to be bound by any theory, applicants believe that the extensional stresses generated in the SAF feed stream/gel, as it flows through the orifice, cause stretching and breaking of the cross-linker, cross-linker attachments to the backbone, and backbone bonds. Applicants expected that gels would generate slip at the walls of the inlet chamber and orifice, and thus they would not generate extensional stresses as they would flow in plug flow in the inlet chamber and orifice (as it is well known to those skilled in the art).

The typical properties of SAF are mechanical properties, swelling capacity, and centrifuge retention capacity (CRC) as measured according to the test method set out herein below. Also, the SAF includes from more than 25 weight-% to less than 95 weight-% of other co-monomers (i.e. other than acrylic acid monomers). Suitable co-monomers are monomeric groups e.g. comprised of/consisting of methyl acrylate, methyl methacrylate, ethyl (meth) acrylate 2-ethyl hexyl (meth) acrylate, or polyacrylamides, polyvinyl alcohol, ethylene maleic anhydride copolymers, polyvinyl ethers, hydroxypropylcellulose, polyvinlmorpholinone, and polymers and copolymers of vinyl sulfonic acid, polyacrylamides, polyvinyl amines, polyallylamines, polyvinylpyridine, and the like. Other suitable polymers in SAF include hydrolyzed acrylonitrile grafted starch, acrylic acid grafted starch, and isobutylene maleic anhydride copolymers and mixtures thereof. The SAF are crosslinked to render the material substantially water insoluble. Preferred monomers are methyl (meth) acrylate, and/or monomers comprising a hydroxylic group, e.g. hydroxyalkyl (meth) acrylates, e.g. hydroxyethyl methacrylate, tripropyleneglycol mono acrylate, 5 glyceryl monoacrylate etc. The SAF can comprise/consist of polymers formed of two kinds of monomers (including acrylic acid) or more preferably of three or more kinds of monomers.

The SAF may have a sodium level as amount of Na in wt % greater than about 8 wt %, or a sodium level as amount of Na in wt % of from 10 wt % to 20 wt %, or from 15 wt % to 18 wt %. In yet another embodiment, the SAF has or a sodium level as amount of Na in wt % below 12 wt % (for the avoidance of doubt, the terms "weight-%", "wt %" and "wt-%" are used herein interchangeably).

The SAF provided in the method may be i) in the form of loose fibers or may be ii) in the form of a nonwoven web, or may be a combination of i) and ii). If the SAF are in the form of a nonwoven web, the nonwoven web may consist of SAF or may comprise SAF. A nonwoven web comprising SAF and provided in the method may comprise at least 50 weight-% of SAF based on the total weight of the nonwoven web, or may comprise at least 60 weight-%, or at least 70 weight-%, or at least 80 weight-%, or at least 90 weight-% of SAF based on the total weight of the nonwoven web.

The nonwoven web may further comprise further components such as synthetic fibers, natural fibers (e.g. cellulose fibers), or combinations thereof. Synthetic fibers that may be comprised by such nonwoven webs may be polyolefin fibers (e.g. polyethylene, polypropylene, or combinations thereof), or PET fibers, or combinations of polyolefin and PET fibers.

The non-SAF components of the nonwoven web may be removed prior to subjecting the SAF to the method of the present disclosure, however, this does not need to be the case. Instead, the nonwoven web comprising the SAF may be subjected to the method of the present disclosure (as complete nonwoven web, cut, shred or milled) together with the non-SAF components of the nonwoven web.

Prior to or during the method of the present disclosure, the nonwoven web may be cut into pieces or may be milled or otherwise shred to make the SAF more accessible to the oxidative water-soluble salt. Alternatively, the nonwoven web is subjected "as is" to the method.

In one embodiment, the feed stream comprises SAF. In another embodiment, the feed stream comprises SAF and water. In yet another embodiment, the feed stream comprises SAF and ethylene glycol (EG). In even yet another embodiment, the feed stream comprises SAF, water, and ethylene glycol. The water in the feed stream can be RO water, regular tap water, or water containing dissolved inorganic salts at various salt concentrations. A non-limiting example of water with salt is a 0.9 wt % solution of sodium chloride. Other salts with monovalent cations, but higher ionic strength, can be used to reduce the viscosity of the feed stream or alternatively to enable higher SAF concentration to be used. A non-limiting example of a viscosity reducing salt is sodium sulfate.

The feed stream can also comprise any free radical producing chemical compound. Non-limiting examples of such chemical compounds are hydrogen peroxide ($H_2O_2$), persulfate (such as, sodium persulfate or potassium persulfate), perborate, perphosphate, percarbonate, diazo compounds, ozone, organic free radical initiators (e.g. di-ter-butyl peroxide (DTBP)), combinations thereof, etc.

In one embodiment, the feed stream comprises SAF and $H_2O_2$. In another embodiment, the feed stream comprises SAF and a $H_2O_2$ solution.

In one embodiment, the feed stream comprises SAF at a concentration greater than about 1 wt %. In another embodiment, the feed stream comprises SAF at a concentration greater than about 5 wt %. In yet another embodiment, the feed stream comprises SAF at a concentration greater than about 10 wt %. In even yet another embodiment, the feed stream comprises SAF at a concentration of about 2.5 wt %. In one embodiment, the feed stream comprises SAF at a concentration of about 5 wt %.

In one embodiment, the feed comprises SAF and a $H_2O_2$ solution, and the concentration of the SAF is about 2.5 wt %, the concentration of the $H_2O_2$ solution is 97.5 wt %, and the concentration of the $H_2O_2$ in the $H_2O_2$ solution is less than about 3 wt %. In another embodiment, the feed comprises SAF and a $H_2O_2$, and the concentration of the SAF is about 5 wt %, the concentration of the $H_2O_2$ solution is about 95 wt %, and the concentration of the $H_2O_2$ in the $H_2O_2$ solution is less than about 3 wt %. In yet another embodiment, the feed comprises SAF and a $H_2O_2$ solution, and the concentration of the SAF is about 2.5 wt %, the concentration of the $H_2O_2$ solution is 97.5 wt %, and the concentration of the $H_2O_2$ in the $H_2O_2$ solution is about 3 wt %. In another embodiment, the feed comprises SAF and a $H_2O_2$, and the concentration of the SAF is about 5 wt %, the concentration of the $H_2O_2$ solution is about 95 wt %, and the concentration of the $H_2O_2$ in the $H_2O_2$ solution is about 3 wt %.

In one embodiment, the feed comprises SAF and a $H_2O_2$ solution, and the concentration of the SAF is about 2.5 wt %, the concentration of the $H_2O_2$ solution is 97.5 wt %, and the concentration of the $H_2O_2$ in the $H_2O_2$ solution is about 0.3 wt %. In another embodiment, the feed comprises SAF and a $H_2O_2$, and the concentration of the SAF is about 5 wt %, the concentration of the $H_2O_2$ solution is about 95 wt %, and the concentration of the $H_2O_2$ in the $H_2O_2$ solution is about 0.3 wt %. In yet another embodiment, the feed comprises SAF and a $H_2O_2$ solution, and the concentration of the SAF is about 2.5 wt %, the concentration of the $H_2O_2$ solution is 97.5 wt %, and the concentration of the $H_2O_2$ in the $H_2O_2$ solution is about 0.03 wt %. In another embodiment, the feed comprises SAF and a $H_2O_2$, and the concentration of the SAF is about 5 wt %, the concentration of the $H_2O_2$ solution is about 95 wt %, and the concentration of the $H_2O_2$ in the $H_2O_2$ solution is about 0.03 wt %.

In one embodiment, the feed comprises SAF and a $H_2O_2$ solution, and the concentration of the $H_2O_2$ in the $H_2O_2$ solution is less than about 3 wt %. In another embodiment, the feed comprises SAF and $H_2O_2$, and the concentration of the $H_2O_2$ in the $H_2O_2$ solution is less than about 0.3 wt %. In yet another embodiment, the feed comprises SAF and $H_2O_2$ solution, and the concentration of the $H_2O_2$ in the $H_2O_2$ solution is less than about 0.03 wt %.

The viscosity of the feed stream is typically measured with a parallel plate fixture in oscillatory mode, and the complex viscosity reported typically corresponds to a frequency of 1 rad/s. Depending on the SAF concentration the complex viscosity of the feed stream can be higher than 200 Pa·s (or equivalently, 200,000 cP). The feed stream can be in the form of a solution or gel, depending on the concentration of SAF.

The non-renewable energy use (NREU) to make acrylic acid (AA) from the fossil-derived propylene is estimated to be about 50 MJ/kg AA. Therefore, any successful recycling attempt of SAF desirably expends less energy than the NREU to make AA, i.e., less than about 50 MJ/kg SAF, for competing environment friendly and commercially with fossil-derived virgin materials. For the purposes of the NREU, it is assumed that the SAF is fully non-neutralized (DN=0).

III Extensional Flow Device and Cavitation

Typically, the feed stream is in fluid communication with the extensional flow device via a tube or a channel, and a pump. Non-limiting examples of tubes or channels are glass tubes, metal tubes, alloy tubes (such as, stainless-steel tubes), and polymer tubes. The tube or channel can have any cross-sectional shape, such as, circular, rectangular, oval, rhombic, etc. Also, the size of the cross-sectional area of the tube or channel can be the same or vary along the flow direction. A non-limiting example of a varying cross-sectional shape of a tube is an undulating tube that can cause the feed stream to experience extensional stresses as it flows down the tube. These extensional stresses might be beneficial to the degradation of the SAF that is part of the feed stream. Also, the feed stream can go through static mixers or other mixing elements placed inside the tube and/or channel that the feed stream flows through.

Non-limiting examples of pumps are centrifugal pumps (such as, axial, radial, and mixed flow pumps) and positive displacement pumps (such as, reciprocating, rotary, piston, diaphragm, gear, peristaltic, screw, and vane). The extensional flow device can employ one or more pumps.

In one embodiment, the extensional flow device is a Liquid Whistle (LW). Typically, a LW includes, in the flow direction, an inlet chamber, an orifice, and a mixing chamber, where a blade is located in front of the orifice and at a distance from it. Also, typically, an extensional flow device includes an inlet and an outlet. The feed stream enters the extensional flow device at the inlet and the product stream exits the extensional flow device at the outlet. Non-limiting examples of extensional flow devices are the SONOLATOR® from Sonic Corp. and MICROFLUIDIZER® from Microfluidics Corp (Newton, MA). In one embodiment, there is no blade downstream of the orifice in the LW.

Non-limiting configurations of the orifice are slot-shaped, eye-shaped, elliptically-shaped, circular, triangular, square, rectangular, and polygonal. The width of the orifice can be up to 1 in. (2.541 cm) or more. The height of the orifice can be up to 0.5 in. (1.27 cm) or more. In another embodiment, the orifice is elliptically-shaped. In yet another embodiment, the width of the orifice is about 1.9 mm and the height of the orifice is about 0.6 mm. Non-limiting examples of the materials used to make the orifice housing are stainless steel, titanium, ceramics, cemented tungsten carbide, various borides, various carbons, various carbides, and various diborides. The land length of the orifice can be up to 10 mm. In one embodiment, the land length of the orifice is between about 0.5 mm and about 5 mm. In another embodiment, the land length of the orifice is about 1 mm.

When the blade of a LW vibrates with its natural frequency it generates intense cavitation and the formed bubbles grow and collapse extremely fast. Non-limiting examples of the materials used to make the blade are stainless steel, titanium, ceramics, cemented tungsten carbide, various borides, various carbons, various carbides, and various diborides. The blade of a LW can have suitable configurations, such as, but not limited to, tapered, with sharpened edge or edges, rectangular or square cross section, etc. The blade of a LW can have any suitable dimensions. In one embodiment, the length of the blade of a LW is between about 1 mm and about 100 mm. In another embodiment, the length of the blade of a LW is between about 10 mm and about 50 mm. In yet another embodiment, the thickness of the blade of a LW is between about 7 µm and about 100 mm. In another embodiment, the thickness of the blade of a LW is between about 0.2 mm and about 50 mm.

The cavitation introduced by the vibrating blade of a LW can be hydrodynamic, acoustic (e.g. between 20 Hz and 20 kHz), or ultrasonic (e.g. above 20 kHz). In one embodiment, the blade of a LW undergoes ultrasonic vibration at a frequency between about 20 kHz and about 100 kHz.

The distance between the blade and the orifice of a LW can vary from about 0.1 mm to about 25 mm. In one embodiment, the distance between the blade and the orifice of a LW is about 0.5 mm. In another embodiment, the distance between the blade and the orifice of a LW is between about 0.5 mm and about 13 mm. In yet another embodiment, the distance between the blade and the orifice of a LW is between about 1 mm and about 10 mm. In even yet another embodiment, the distance between the blade and the orifice of a LW is between about 3 mm and about 6 mm.

In one embodiment, the blade is at a distance from the orifice of a LW so that no cavitation is achieved when the fluid jet emerges from the orifice and impinges onto the blade. In another embodiment, the blade is at a distance from the orifice of a LW so that cavitation is achieved when the fluid jet emerges from the orifice and impinges onto the blade. In yet another embodiment, the cavitation achieved in the extensional flow device is hydrodynamic. In even yet another embodiment, the cavitation achieved in the extensional flow device is ultrasonic. In one embodiment, the cavitation achieved in the extensional flow device is acoustic.

In one embodiment, the distance of the blade from the orifice of a LW is at least about 7 times the hydraulic diameter of the orifice. In another embodiment, the distance of the blade from the orifice of a LW is less than about 7 times the hydraulic diameter of the orifice. In yet another embodiment, the distance of the blade from the orifice of a LW is about 6 times the hydraulic diameter of the orifice. In even yet another embodiment, the distance of the blade from the orifice of a LW is at about 0.3 times the hydraulic diameter of the orifice.

The process may be carried out at any suitable pressure, which is measured at the feed stream and upstream of the orifice. In one embodiment, the pressure is between about 500 psi (34.5 bar) and about 20,000 psi (1379 bar). In another embodiment, the pressure is higher than about 20,000 psi (1379 bar). In yet another embodiment, the pressure is between about 1000 psi (68.9 bar) and about 10,000 psi (689.5 bar). In even yet another embodiment, the pressure is between about 2,000 psi (137.9 bar) and about 7,000 psi (482.6 bar). In one embodiment, the pressure is about 5,000 psi (344.7 bar).

The flowrate of the feed stream into the extensional flow device can be of any suitable value. In one embodiment, the flowrate of the feed stream into the extensional flow device is between about 1 L/min and about 1,000 L/min. In another embodiment, the flowrate of the feed stream into the extensional flow device is between about 2 L/min and about 500 L/min. In yet another embodiment, the flowrate of the feed stream into the extensional flow device is between about 3 L/min and about 200 L/min. In even yet another embodiment, the flowrate of the feed stream into the extensional flow device is between about 4 L/min and about 100 L/min. In one embodiment, the flowrate of the feed stream into the extensional flow device is about 5 L/min.

The residence time of the feed stream in the extensional flow device can be of any suitable value. The residence time is defined as the average time the feed stream spends in the extensional flow device as a whole, not only in the orifice nor in the inlet and mixing chambers only. In one embodiment, the residence time of the feed stream in the extensional flow device is less than about 120 s. In another embodiment, the residence time of the feed stream in the extensional flow device is less than about 60 s. In yet another embodiment, the residence time of the feed stream in the extensional flow device is less than about 15 s. In one embodiment, the residence time of the feed stream in the extensional flow device is between about 1.5 s and about 50 s. In another embodiment, the residence time of the feed stream in the extensional flow device is between about 2 s and about 20 s. In yet another embodiment, the residence time of the feed stream in the extensional flow device is between about 2.5 s and about 10 s. In even yet another embodiment, the residence time of the feed stream in the extensional flow device is between about 3 s and 5 s.

The residence time of the feed stream in the orifice of the extensional flow device can be of any suitable value. In one embodiment, the residence time of the feed stream in the orifice is between about 1 ms and about 100 ms. In another embodiment, the residence time of the feed stream in the orifice is between about 2 ms and about 50 ms. In yet another embodiment, the residence time of the feed stream in the orifice is between about 5 ms and about 20 ms. In even yet another embodiment, the residence time of the feed stream in the orifice is between about 7 ms and about 15 ms. In one embodiment, the residence time of the feed stream in the orifice is about 11 ms.

The total energy is the electric energy that is supplied to the extensional flow device and is based on the voltage and amperage of the device, and the residence time of the feed stream. The specific energy is the energy that is dissipated in the feed stream inside the extensional flow device, it is used to convert SAF to soluble polymers, and is based on the pressure drop in the feed stream as it flows through the extensional flow system. The calculations for the total energy and specific energy are exemplified in the Methods section VII (as they are well known to those skilled in the art).

In one embodiment, the specific energy used to convert SAF to soluble polymers is less than about 30 MJ/kg SAF. In another embodiment, the specific energy used to convert SAF to soluble polymers is less than about 20 MJ/kg SAF. In yet another embodiment, the specific energy used to convert SAF to soluble polymers is less than about 10 MJ/kg SAF. In even yet another embodiment, the specific energy used to convert SAF to soluble polymers is less than about 5 MJ/kg SAF. In one embodiment, the specific energy used to convert SAF to soluble polymers is less than about 1 MJ/kg SAF.

In one embodiment, the total energy used to convert SAF to soluble polymers is less than about 50 MJ/kg SAF. In another embodiment, the total energy used to convert SAF to soluble polymers is less than about 32 MJ/kg SAF. In yet another embodiment, the total energy used to convert SAF to soluble polymers is less than about 16 MJ/kg SAF. In even yet another embodiment, the total energy used to convert SAF to soluble polymers is less than about 10 MJ/kg SAF. In one embodiment, the total energy used to convert SAF to soluble polymers is less than about 2 MJ/kg SAF.

The extensional flow can take place at room temperature or any other temperature. Furthermore, the extensional flow can be preceded or followed by other processes, such as microwave heating, UV irradiation, IR heating, ultrasonic/cavitation, extrusion, extensional stretching, etc.

IV Product Stream

The feed stream flows into the inlet of the extensional device and produces a product stream at the outlet of the extensional flow device. In one embodiment, the product stream comprises soluble polymers. In another embodiment, the product stream comprises soluble polymers and SAF.

In one embodiment, the soluble polymers have a weight-average molecular weight less than about 5,000,000 g/mol. In another embodiment, the soluble polymers has a weight-average molecular weight less than about 2,000,000 g/mol. In yet another embodiment, the soluble polymers have a weight-average molecular weight less than about 1,000,000 g/mol. In even yet another embodiment, the soluble polymers have a weight-average molecular weight less than about 500,000 g/mol. In one embodiment, the soluble polymers has a weight-average molecular weight less than about 300,000 g/mol. In another embodiment, the soluble polymers have a weight-average molecular weight less than about 200,000 g/mol. In yet another embodiment, the soluble polymers have a weight-average molecular weight less than about 100,000 g/mol. In even yet another embodiment, the soluble polymers have a weight-average molecular weight less than about 30,000 g/mol.

In one embodiment, the soluble polymers have a weight-average molecular weight between about 1,000,000 g/mol and about 5,000,000 g/mol. In another embodiment, the soluble polymers have a weight-average molecular weight between about 500,000 g/mol and about 2,000,000 g/mol. In yet another embodiment, the soluble polymers have a weight-average molecular weight between about 100,000 g/mol and about 1,000,000 g/mol. In even yet another embodiment, the soluble polymers have a weight-average molecular weight between about 150,000 g/mol and about 500,000 g/mol. In one embodiment, the soluble polymers have a weight-average molecular weight between about 90,000 g/mol and about 300,000 g/mol. In another embodiment, the soluble polymers have a weight-average molecular weight between about 20,000 g/mol and about 200,000 g/mol. In yet another embodiment, the soluble polymers have a weight-average molecular weight between about 10,000 g/mol and about 100,000 g/mol.

In one embodiment, the soluble polymers have a polydispersity index (PDI) less than about 10. In another embodiment, the soluble polymers have a PDI less than about 6. In yet another embodiment, the soluble polymers have a PDI less than about 4. In even yet another embodiment, the soluble polymers have a PDI less than about 2. PDI is the ratio of the weight-average molecular weight to the number-average molecular weight, and these molecular weights are measured by GPC (described in the Methods section VII) as it is known to those skilled in the art.

The viscosity of the product stream is typically measured with either a parallel plate fixture in oscillatory mode or a cup and bob fixture in steady mode. The oscillatory viscosity reported typically corresponds to 1 rad/s, and the steady viscosity reported typically corresponds to a shear rate of 4 $s^{-1}$. Depending on the soluble polymers concentration and molecular weight, the viscosity of the product stream can be as low as 1 mPa·s (or equivalently, 1 cP; i.e., the viscosity of water).

The ratio of the viscosity of the product stream to the viscosity of the feed stream is the viscosity reduction ratio (or simply, viscosity ratio). It indicates the extent of the SAF degradation to soluble polymers by the UV flow system. The negative decadic logarithm of the viscosity ratio measures the orders of magnitude change between the viscosity of the feed stream and the product stream. In one embodiment, the feed stream has a viscosity; the product stream has a viscosity; the ratio of the viscosity of the product stream to the viscosity of the feed stream is the viscosity ratio; and the negative decadic logarithm of the viscosity ratio is less than about 6. In another embodiment, the feed stream has a viscosity; the product stream has a viscosity; the ratio of the viscosity of the product stream to the viscosity of the feed stream is the viscosity ratio; and the negative decadic logarithm of the viscosity ratio is less than about 4. In yet another embodiment, the feed stream has a viscosity; the product stream has a viscosity; the ratio of the viscosity of the product stream to the viscosity of the feed stream is the viscosity ratio; and the negative decadic logarithm of the viscosity ratio is less than about 2.

Soluble polymers from the product stream can be derivatized into materials for various applications, such as, adhesives, coatings, water treatment, etc. In one embodiment, soluble polymers from the product stream, either as is or derivatized, is used as an adhesive. In yet another embodiment, soluble polymers from the product stream, either as is or derivatized, are used in fabric care applications. In even yet another embodiment, soluble polymers from the product stream, either as is or derivatized, are used in water treatment applications.

In one embodiment, soluble polymers from the product stream are used as a ply glue in paper products. In another embodiment, soluble polymers from the product stream are used as a ply glue in paper towel products. In yet another embodiment, soluble polymers from the product stream are used as a ply glue in toilet paper products. In even yet another embodiment, soluble polymers from the product stream are used as ply glue in paper products has $M_w$ greater than about 350 kDa. In one embodiment, soluble polymers from the product stream are used as ply glue in paper products has $M_w$ between about 400 kDa and about 500 kDa.

In another embodiment, soluble polymers from the product stream are used as a glue between the paper core and paper towel products. In even another embodiment, soluble polymers from the product stream are used as a glue between the paper core and toilet paper products.

Soluble polymers can be extracted from the product stream via a number of processes. Non-limiting examples of these processes are water evaporation, soluble polymer filtration, water extraction, etc. Also, salts present in the product stream from the use of SAF in AHPs can be removed via any desalination technique known to those skilled in the art. Non-limiting examples of desalination processes are membrane processes (e.g. reverse osmosis, forward osmosis, electrodialysis reversal (EDR), nanofiltration, etc.), freezing desalination, solar desalination, geothermal desalination, ion exchange, wave powered desalination, etc.

V Recycled SAF

Soluble polymers from the product stream can be fed into the process to make SAF, thus producing recycled SAF. In one embodiment, the soluble polymers are used to produce a recycled SAF.

In one embodiment, the recycled SAF has a CRC (as measured according to the CRC test method described herein), and wherein the CRC is between about 7 g/g and about 45 g/g. In another embodiment, the recycled SAF has a CRC, and wherein the CRC is between about 10 g/g and about 35 g/g. In yet another embodiment, the recycled SAF has a CRC, and wherein the CRC is between about 15 g/g and about 35 g/g.

VII Methods

NMR Content Method

The NMR Content Method is used to determine the ratio on a molar basis of functional groups with different NMR signals such as alkene terminal moieties, alkoxy groups (—O—$CHR_1$— with $R_1$ one of the group H, alkyl, aryl, heteroaryl, alkoxy or halogene), aliphatic groups (—$CHR_1$— with $R_1$ one of the group H, alkyl, aryl, heteroaryl or halogene) and/or other $^1$H-NMR active groups.

In this method, proton NMR spectroscopy is used to analyze a sample of soluble material in deuterated water, and peaks of different $^1$H-NMR domains are integrated, and ratioed to determine the mole percent of protons of the functional groups or different $^1$H-NMR domains, respectively.

The soluble polymer is dried in a vacuum oven (Heraeus Vacutherm type, Thermo Scientific™) at 40° C. and pressure between 10 and 50 mbar for 3 hours. Any small molecular weight alcohol, ester or ether is removed from the soluble polymer.

A flowable solution less than 10% by weight sample dissolved in $D_2O$ and pH adjusted to 5.5-6.5 is prepared. The solution is transferred to an NMR glass grade tube and placed in the sample holder (bore) of a proton NMR instrument. An example of a suitable instrument is a Bruker NMR device with 400 MHZ field strength. Instruments of other makes and other field strengths, even including "low-field" instruments operating as low as 60 MHz, can successfully be used to perform this method. A noesy-presat sequence is used to acquire the data and suppress the residual water signal. One of skill will be familiar with appropriate choice of other specific data collection parameters. Appropriate parameters used with the exemplary 400-MHz Bruker instrument above are: acquisition time (FID length) of 4.1 s, relaxation time of 8 s, 90-degree pulse widths, spectral width of 20 ppm, 64k points in the FID, and 64 repetition scans used. In the Fourier transform step, exponential apodization is used with 0.3-Hz line broadening, and the spectrum is phased into absorption. A spline baseline correction is used to ensure flat baseline on either side of peaks to be integrated.

The following peak domains are typically used for the content determination and integrated:

1) One of two terminal alkene protons at chemical shifts in the range of appr. 5-6 ppm, typically one terminal alkene proton at appr. 5.35 ppm+/−0.5 ppm. (To confirm the identify of such proton peak as terminal alkene proton a standard edited $^1$H-$^{13}$C HSQC sequence can be used (following e.g. W. Willker, D. Leibfritz, R. Kerssebaum & W. Bermel, Magn. Reson. Chem. 31, 287-292 (1993)) to determine that the alkene signals seen in the 1D-1H spectrum are both attached to the same methylene (secondary) carbon (—$CH_2$).). The resulting integral is called "integral_alkene".

2) alkoxy protons at chemical shifts in the range of appr. 3.2-3.8 ppm, typically at appr. 3.6 ppm. The resulting integral is called "integral_3.6". In case more than one signal appears at appr. 3.6 ppm, i.e. in the range of appr. 3.2-3.8 ppm, the signal with the largest integral is chosen to get "integral_3.6".

3) methylene protons of aliphatic CH-groups, typically at ca. 1.5 ppm and 2.1 ppm, or at ca. 1.8 ppm. The resulting integral is called "integral_CH".

4) other aliphatic groups at chemical shifts in the range of appr. 1.0-2.6 ppm.

5) other groups or peaks of different $^1$H-NMR domains can be analyzed as well, provided that they
   a) are separated signals,
   b) have peak maxima are at a distance of at least 0.5 ppm.
6) The peaks in the NMR spectrum corresponding to class 1), 2), 3) and/or 4) are identified and, if present, integrated. If no such peak is present, this reported as no measurable content of class 1), 2), 3) or 4), respectively. As known by the person skilled in the art, the integration ranges from baseline (start of signal) to baseline (end of signal), or in case of broad and/or complex the boarders of integration result from the start of the next neighbouring signal.

The ratio "ratio 3.6:CH" is calculated via the following formula:

ratio 3.6:CH=integral_3.6/integral_CH ratio 3.6:CH is a unitless number an represents the ratio of protons at ca. 3.6 ppm The content of alkene "% alkene" is calculated via the following formula:

% alkene=[integral_alkene/(integral_alkene+integral_3.6+integral_CH)]*100%

The content of methylene "% CH" is calculated via the following formula:

% CH=[integral_CH/(integral_alkene+integral_3.6+integral_CH)]*100%

The content of protons at about 3.6 ppm (such as alkoxy protons) "%3.6 ppm" is calculated via the following formula:

%3.6=[integral_3.6/(integral_alkene+integral_3.6+integral_CH)]*100%

The ratio "ratio 3.6:CH" is reported to the nearest 0.001.

The content of alkene, methylene and protons at about 3.6 ppm are reported in % to the nearest 0.01%.

Centrifuge Retention Capacity (CRC) Test Method

Capacity of the superabsorbent fibers is determined according to the Centrifuge Retention Capacity (CRC) test method as set out in EDANA NWSP 241.0.R2(19). In deviation from EDANA NWSP 241.0.R2(19) the sampling (chapter 8 in EDANA NWSP 241.0.R2(19)) for the superabsorbent fibers, superabsorbent nonwovens and/or the superabsorbent core is as following:

The superabsorbent fibers, superabsorbent nonwovens and/or the superabsorbent core are cut into pieces with approximately 5 mm as largest dimension. The cutting can e.g. be done manually with scissors. Care is taken that the fibrous structure (the core, the nonwoven or the bulk of fibers) is not majorly compressed before or during the cutting process. This ensures sufficient void space between the superabsorbent fibers, so they can be predominately wetted by the swelling medium at the entire surface area.

Further deviations from or additions to EDANA NWSP 241.0.R2(19) in the procedure (chapter 9.1-9.5 in EDANA NWSP 241.0.R2(19)) for the superabsorbent fibers, superabsorbent nonwovens and/or the superabsorbent core are as following:

The sample for the measurement is taken carefully, e.g. with a lab pincet, to put it into the teabag. With a lab pincet, the fibers are carefully distributed in the teabag to avoid lumps and fiber lumps, if any, are carefully opened.

When sealing the teabag, care is taken that no material of the superabsorbent fibers, superabsorbent nonwovens and/or the superabsorbent core is in the area of the seal. This ensures a complete and sufficiently strong sealing of the teabag.

All other items of the test method are executed as set out in EDANA NWSP 241.0.R2(19).

Total Energy Calculations

The total energy is the electric energy that is supplied to the extensional flow device and is based on the voltage and amperage of the device, and the residence time of the feed stream. The extensional flow device typically calculates the total energy from the motor torque and speed, and residence time of the feed stream in the extensional flow device. The total energy per unit mass of SAF is then calculated from the total energy and the amount of SAF that is in the feed stream.

Specific Energy Calculations

The specific energy is the energy dissipated in the feed stream, it is used to convert SAF to soluble polymers, and is based on the pressure drop in the feed stream as it flows through the extensional flow system. As an example, if the pressure drop in the feed stream is 4945 psi (341 bar), the volume of the feed stream is 400 mL, and the feed stream density is 1 g/mL, then the specific energy is calculated as: (341 (bar)×0.4 (L))/(400 (mL)×0.025 (g SAF/g)×1 (g/mL)) =1.36 MJ/kg SAF.

Molecular Weight Distribution (MWD) Analysis

It is done using Gel Permeation Chromatography (GPC) with Multi-Angle Light Scattering (MALS) and Refractive Index (RI) detection. Samples are made at concentration of 1 mg/mL in 0.1M $NaNO_3$/0.02 wt % Sodium Azide ($NaN_3$) with a gentle mixing at room temperature for overnight hydration. Samples are then filtered through a 0.8 μm filter before the GPC-MALS/RI analysis. The absolute MWD distribution is calculated using do/dc value of 0.15.

The foregoing description is given for clearness of understanding only, and no unnecessary limitations should be understood therefrom, as modifications within the scope of the invention may be apparent to those having ordinary skill in the art.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, comprising any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for degrading superabsorbent fibers (SAF) to soluble polymers, wherein the soluble polymers comprise from 5 weight-% to 75 weight-% of polymerized acrylic acid monomer units based on the total weight of the soluble polymers, the method comprising:

flowing a feed stream comprising the SAF into an inlet of an extensional flow device and producing a product stream comprising the soluble polymers at an outlet of the extensional flow device; wherein the feed stream comprises the SAF at a concentration greater than about 1 wt %; wherein the feed stream has a residence time in the extensional flow device of less than about 120 s; and wherein the degradation of the SAF to the soluble polymers requires a total energy of less than about 50 MJ/kg SAF.

2. The method of claim 1, wherein the residence time is less than about 60 s.

3. The method of claim 1, wherein the total energy is less than about 16 MJ/kg SAF.

4. The method of claim 1, wherein the feed stream comprises SAF and water.

5. The method of claim 1, wherein the feed stream comprises SAF and hydrogen peroxide.

6. The method of claim 1, wherein the SAF has a sodium level as amount of Na of more than 8 wt %.

7. The method of claim 1, wherein the SAF has a sodium level as amount of Na of between about 10 wt % and about 20 wt %.

8. The method of claim 1, wherein the feed stream has a viscosity; wherein the product stream has a viscosity; wherein the ratio of the viscosity of the product stream to the viscosity of the feed stream is the viscosity ratio; and wherein the negative decadic logarithm of the viscosity ratio is less than about 6.

9. The method of claim 1, wherein the feed stream has a viscosity; wherein the product stream has a viscosity; wherein the ratio of the viscosity of the product stream to the viscosity of the feed stream is the viscosity ratio; and wherein the negative decadic logarithm of the viscosity ratio is less than about 4.

10. The method of claim 1, wherein the feed stream has a viscosity; wherein the product stream has a viscosity; wherein the ratio of the viscosity of the product stream to the viscosity of the feed stream is the viscosity ratio; and wherein the negative decadic logarithm of the viscosity ratio is less than about 2.

11. The method of claim 1, wherein the soluble polymers have a weight-average molecular weight less than about 2,000,000 g/mol.

12. The method of claim 1, wherein the soluble polymers have a weight-average molecular weight less than about 1,000,000 g/mol.

13. The method of claim 1, wherein the soluble polymers have a polydispersity index (PDI) less than about 4.

14. The method of claim 1, wherein the SAF have a Centrifuge Retention Capacity of at least 15 g/g, as measured according to the test method set out herein.

15. A method for degrading superabsorbent fibers (SAF) to soluble polymers, wherein the soluble polymers comprise from 5 weight-% to 75 weight-% of polymerized acrylic acid monomer units based on the total weight of the soluble polymers, the method comprising:

flowing a feed stream comprising the SAF into an inlet of an extensional flow device and producing a product stream comprising soluble polymers at an outlet of the extensional flow device; wherein the feed stream comprises water and SAF at a concentration greater than about 1 wt %; wherein the feed stream has a residence time in the extensional flow device of less than about 120 s; wherein the degradation of the SAF to the soluble polymers requires a total energy of less than about 16 MJ/kg SAF; and wherein the soluble polymers have a weight-average molecular weight less than about 1,000,000 g/mol.

16. A method for degrading superabsorbent fibers (SAF) to soluble polymers, wherein the soluble polymers comprise from 5 weight-% to 75 weight-% of polymerized acrylic acid monomer units based on the total weight of the soluble polymers, the method comprising:

flowing a feed stream comprising the SAF into an inlet of an extensional flow device and producing a product stream comprising soluble polymers at an outlet of the extensional flow device; wherein the feed stream comprises water and SAF at a concentration greater than about 5 wt %; wherein the feed stream has a residence time in the extensional flow device of less than about 120 s; wherein the degradation of the SAF to the soluble polymers requires a total energy of less than about 16 MJ/kg SAF; and wherein the soluble polymers have a weight-average molecular weight less than about 1,000,000 g/mol.

17. The method of claim 16, wherein the feed stream has a viscosity; wherein the product stream has a viscosity; wherein the ratio of the viscosity of the product stream to the viscosity of the feed stream is the viscosity ratio; and wherein the negative decadic logarithm of the viscosity ratio is less than about 4.

18. The method of claim 16, wherein the SAF has a sodium level as amount of Na of between about 10 wt % and about 20 wt %.

19. The method of claim 16, wherein the feed stream comprises SAF and hydrogen peroxide.

20. The method of claim 16, wherein the SAF are provided as loose fibers.

21. The method of claim 16, wherein the SAF are provided in the form of a nonwoven web, wherein the nonwoven web comprises SAF.

22. The method of claim 21, wherein the nonwoven web is cut, shred or milled prior to being provided to the method or while carrying out the method.

* * * * *